United States Patent [19]

Chaplin

[11] 4,336,943
[45] Jun. 29, 1982

[54] WEDGE-SHAPED SEAL FOR FLANGED JOINTS

[75] Inventor: Gary F. Chaplin, Vernon, Conn.

[73] Assignee: United Technologies Corporation, Hartford, Conn.

[21] Appl. No.: 207,498

[22] Filed: Nov. 14, 1980

[51] Int. Cl.³ .......................... F16J 15/00; F16J 15/54
[52] U.S. Cl. .................................... 277/26; 277/167.5; 277/169; 277/206 R; 414/113
[58] Field of Search ................ 277/26, 167.5, 169, 277/171, 206 R; 415/113

[56] References Cited

U.S. PATENT DOCUMENTS

| | | | |
|---|---|---|---|
| 1,132,086 | 3/1915 | Goodall | 277/167.5 |
| 1,965,273 | 7/1934 | Wilson | 277/167.5 |
| 3,042,367 | 7/1962 | Welsh | 415/113 |
| 3,240,501 | 3/1966 | Smith | 277/167.5 |
| 3,520,544 | 7/1970 | Taylor | 277/206 R |
| 3,575,432 | 4/1971 | Taylor | 277/26 |
| 3,758,123 | 9/1973 | Ksieski | 277/206 R |
| 3,797,836 | 3/1974 | Halling | 277/206 R |
| 3,857,572 | 12/1974 | Taylor et al. | 277/206 R |
| 3,971,566 | 7/1976 | Levinsohn | 277/206 R |
| 4,184,689 | 1/1980 | Brodell | 277/26 |

Primary Examiner—Robert I. Smith
Attorney, Agent, or Firm—Gene D. Fleischhauer

[57] ABSTRACT

A flanged joint 20 having a seal ring 38 is disclosed. The flanged joint includes two cylindrical case structures 24,26. The seal ring is disposed in a groove 40 formed between two outwardly convergent sidewalls 32,34. The seal ring has a wedge-shaped cross section 48 and may operate with a higher coefficient of thermal expansion than the adjacent case structure or at a higher temperature than the adjacent case structure.

9 Claims, 5 Drawing Figures

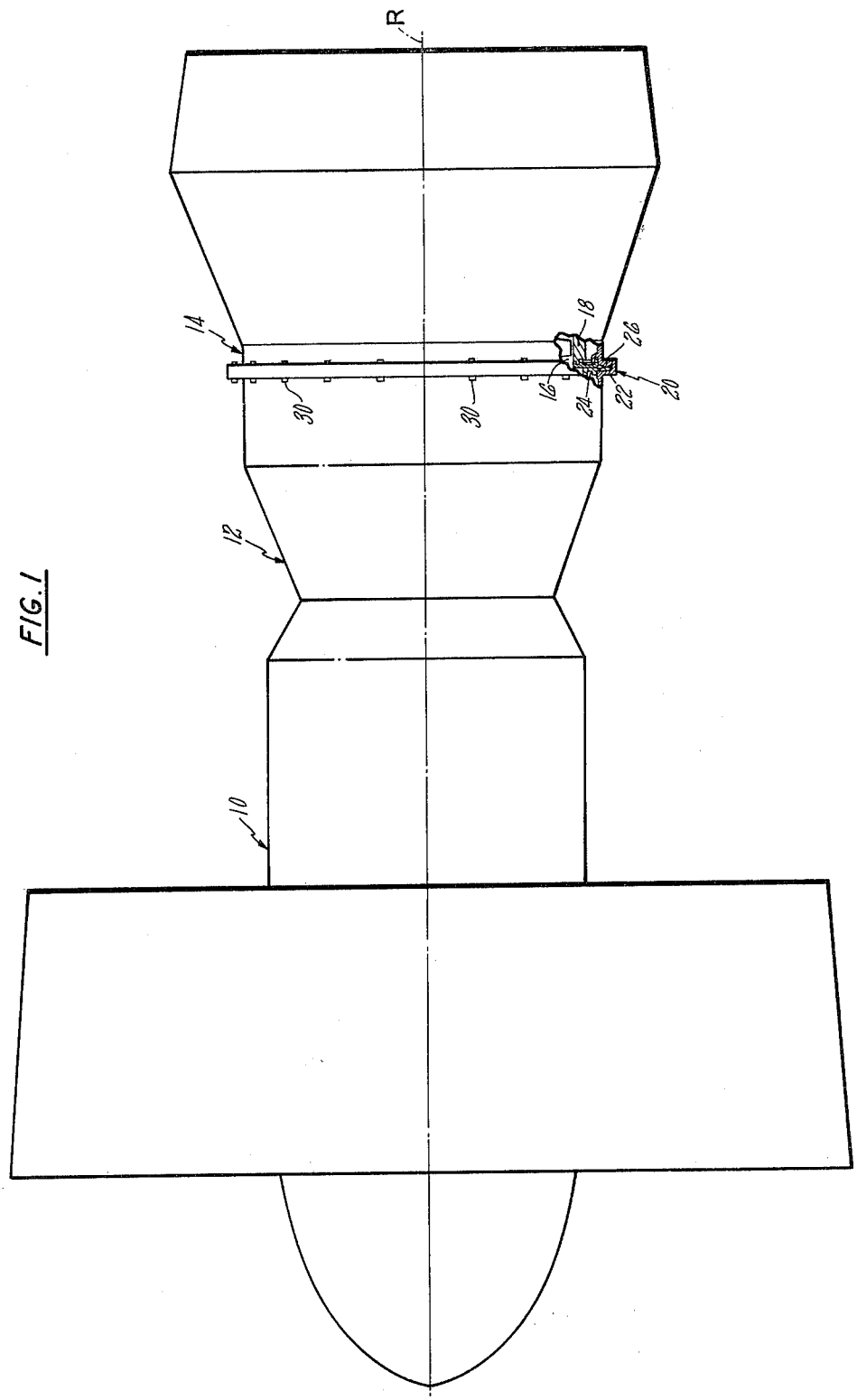

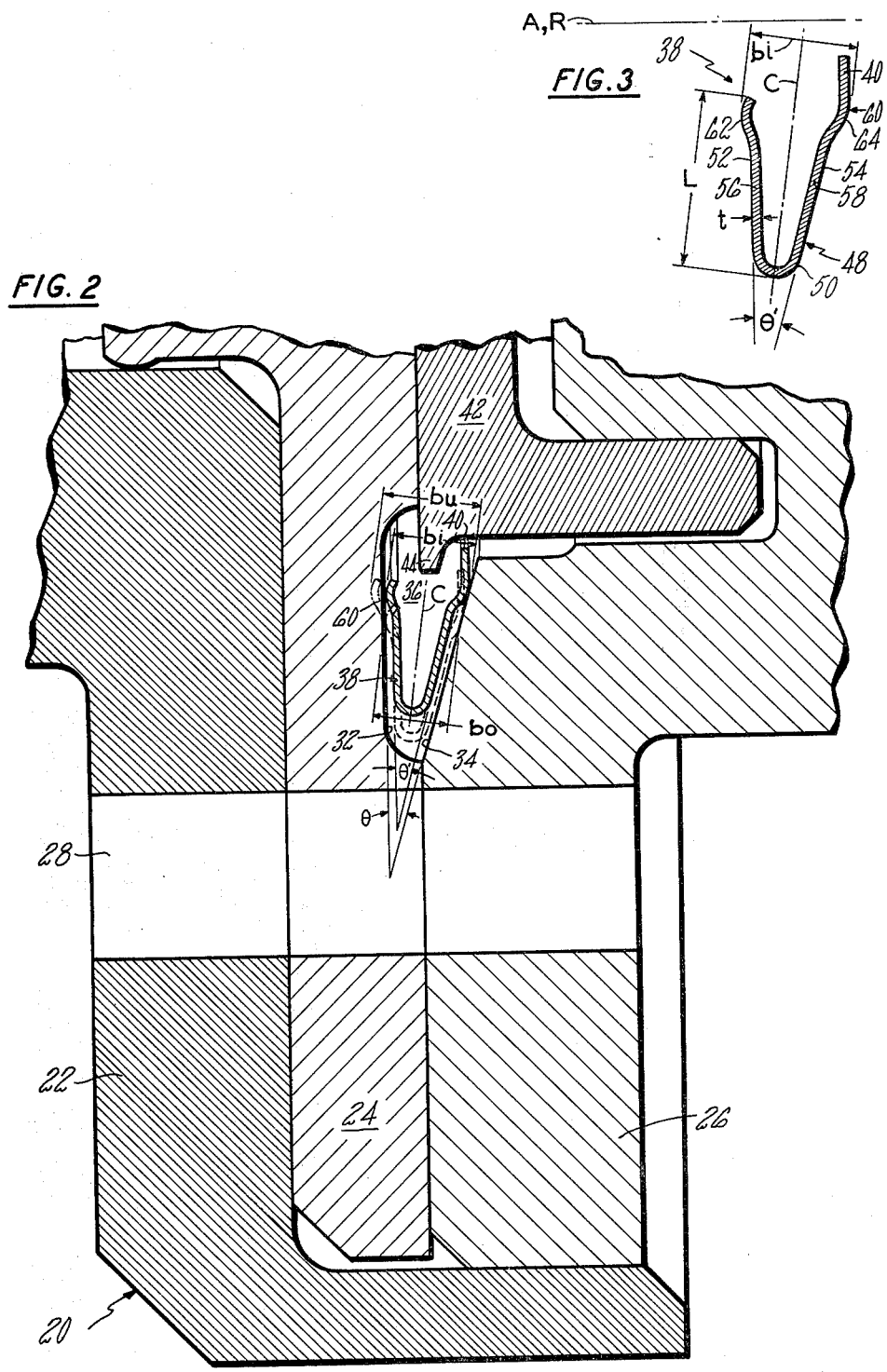

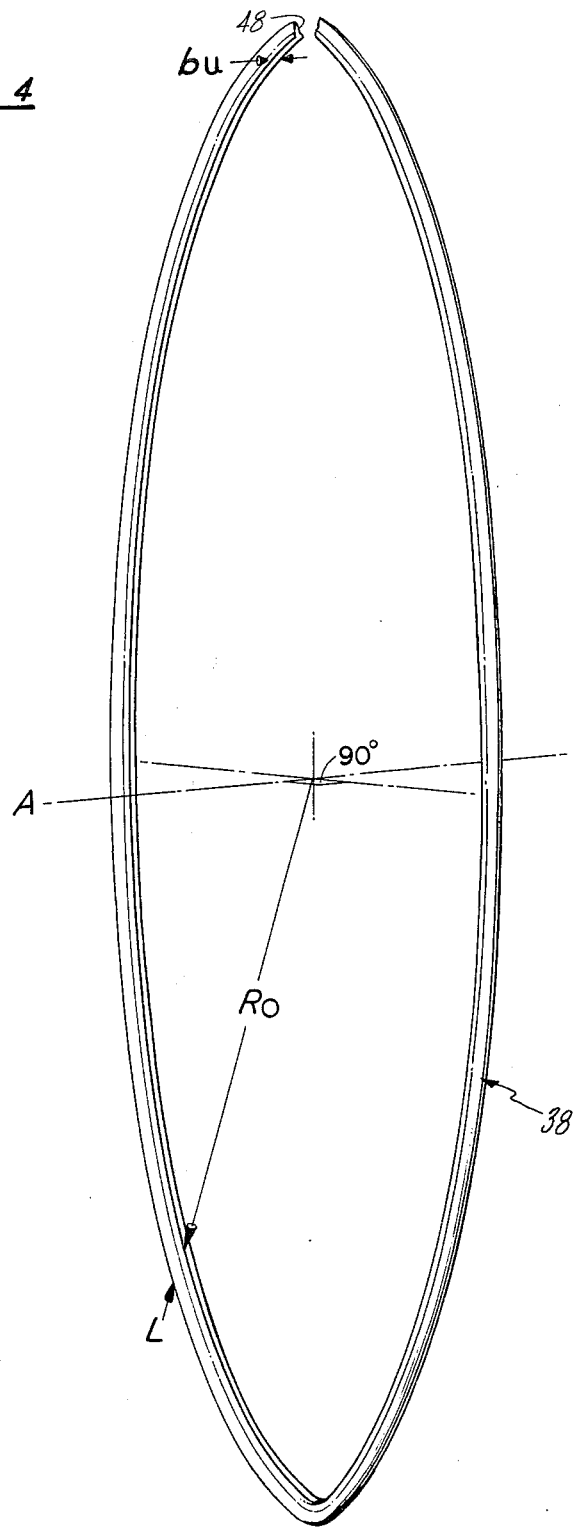

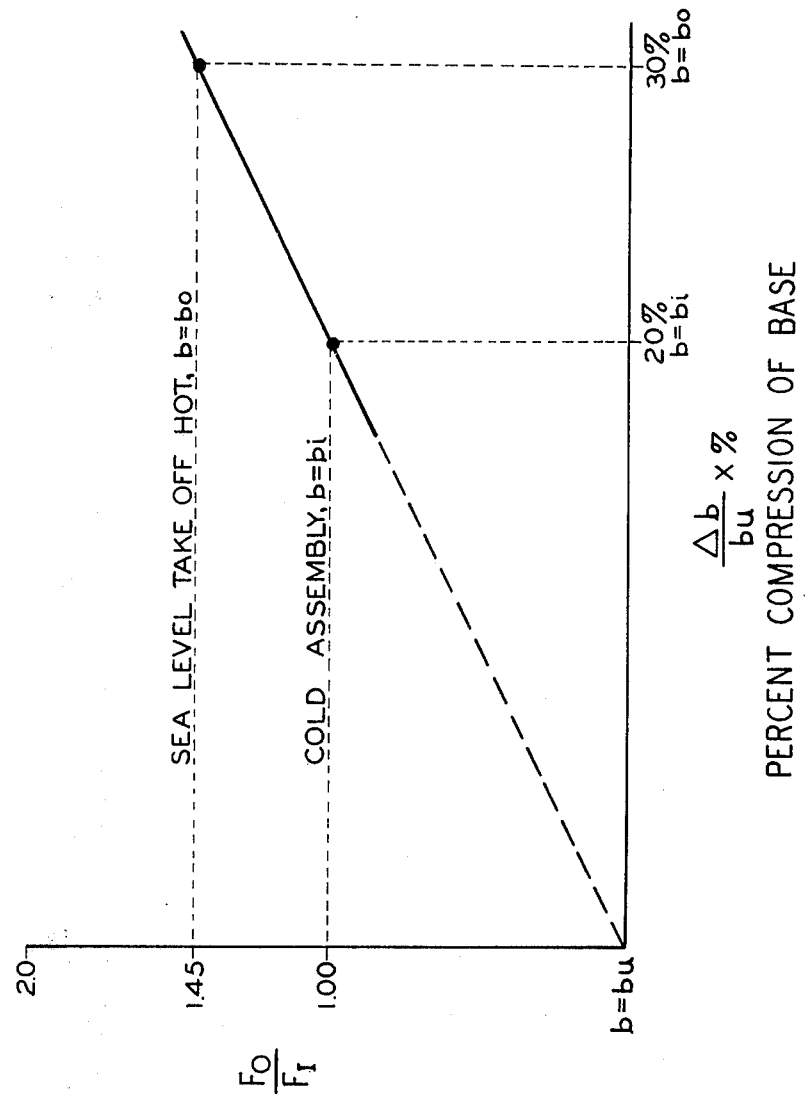

WEDGE-SHAPED SEAL FOR FLANGED JOINTS

DESCRIPTION

1. Technical Field

This invention relates to flanged joints and is particularly applicable to the flanged joints of gas turbine engines.

2. Background Art

Conduits for a working medium fluid are often formed of axially extending segments which are joined one to another at a flanged joint. The flanged joint is a potential leak path for the working medium fluid where the working medium fluid is at a higher pressure than the ambient pressure or a potential leak path for the ambient gases where the ambient pressure is higher than the working medium pressure. The leak path is often caused by tolerance variations in the flanges, by warpage of the flanges due to uneven heating and cooling and by uneven thermal gradients in the flanges. Accordingly, it is desirable to provide a seal member between the flanges to block such leakage. An example of a flanged joint incorporating such a seal means is shown in U.S. Pat. No. 3,520,544 entitled "Y Ring Seal" issued to Taylor. In Taylor the Y ring seal has a Y-shaped radial cross section. The seal is disposed between two members and subjected to high compressive forces such that the seal is compressed and deformed until an internal line to line contact is created. Examples of other constructions are shown in U.S. Pat. No. 3,857,572 entitled "E-Ring Seal Assembly" issued to Taylor et al. and U.S. Pat. No. 3,758,123 entitled "Omega Seal" issued to Ksieski. The E-Ring seal has an E-shaped radial cross section; the Omega seal has an omega shaped radial cross section. In other constructions, the cross section of the seal has the shape of the letter C and is accordingly referred to as a "C Seal". These types of seals are used in many fields.

Although seal rings used in the aircraft engine field have utility in other fields, seal rings used in other fields do not always have utility in aircraft engines. For example, seal rings having a radial cross section which requires a base dimension as large as the radially oriented length of the cross section also require a larger seal groove than seal rings which have a narrower base dimension. A larger seal groove requires a larger flange. As the size of the flange increases, the weight of the flange increases. These wide base seals are undesirable for flanges in aircraft engines because the increase in weight increases the amount of energy consumed by the engine in propelling the aircraft. Aircraft engines may have another requirement for seal rings. In aircraft engines the pressure difference between the fluid pressure and the ambient pressure difference varies with time. Accordingly seal rings are desired which exert a greater sealing force at those operating conditions of the engine which cause the greatest difference in pressure across the seal rings.

DISCLOSURE OF INVENTION

According to the present invention, a wedge-shaped seal ring disposed in a constricting gap between two outwardly convergent sidewalls on adjacent case members is driven radially between the members by thermal expansion to develop a lateral sealing force.

A primary feature of the present invention is a flange joint having a circumferentially extending seal ring. The flange joint has a pair of outwardly convergent sidewalls. Another feature is the substantially wedge-shaped cross section of the seal ring. The seal ring viewed in cross section has a tip region and a pair of surfaces extending inwardly from the tip region. In one embodiment the acute angle between the convergent walls is an angle of about twenty (20) degrees to about forty (40) degrees and the acute angle between surfaces on the ring is an angle of about twenty (20) degrees to about forty (40) degrees. In another embodiment, the seal ring has a radially oriented length L, a base dimension b, and an arm spaced a distance $R_o$ from the axis of symmetry such that the ratio of $R_o$ to the length L lies in the range of seventy to one hundred seventy and the ratio of the length to the base dimension b is greater than or equal to one and one-half but less than three and one-half.

A principal advantage of the present invention is the gain in engine efficiency which results from blocking the leakage of working medium gases between adjacent case structures. The sealing force between the seal ring and flanges on the case structure increases because of thermal expansion as the seal ring is heated. Another advantage is the avoidance of a performance penalty associated with C-shaped seal rings because the size of the flanges need not be increased to accommodate a wedge-shaped seal ring in the seal groove to the extent required to form a seal groove for a C-shaped seal ring developing an equivalent seal force. In one embodiment, the possibility of misalignment of the seal ring during assembly of the flange joint is reduced by the dimensional stability of the seal ring in the free state which results from the radial length to base dimension ratio of the cross section of the seal ring.

The foregoing, and other objects, features and advantages of the present invention will become more apparent in the light of the following detailed description of the preferred embodiment thereof as shown in the accompanying drawing.

BRIEF DESCRIPTION OF THE DRAWINGS

FIG. 1 is a simplified side elevation view of a gas turbine engine with a portion of the case broken away to show a flanged joint;

FIG. 2 is an enlarged cross section view of the flanged joint;

FIG. 3 is an enlarged cross-sectional view of a seal ring;

FIG. 4 is a perspective view of the seal ring shown in FIG. 2 in the uninstalled condition;

FIG. 5 is a graphical representation of the normalized sealing force versus the normalized reduction in the base dimension b of the base of the seal ring for an uninstalled seal ring, for an installed seal ring and for a seal ring during operation.

BEST MODE FOR CARRYING OUT THE INVENTION

A turbofan, gas turbine engine embodiment of the invention is illustrated in FIG. 1. The engine shown has an axis of rotation R. The principal sections of the engine include a compression section 10, a combustion section 12, and a turbine section 14. An annular flow path 16 for hot working medium gases extends axially through the engine. A stator assembly 18 extending axially through the engine bounds the flow path for working medium gases. The stator assembly has a flanged joint 20 in the turbine section.

As shown in FIG. 1 and FIG. 2, the flanged joint 20 extends circumferentially about the engine and is formed of at least two cylindrical case structures, such as the upstream case 22, the upstream ring 24 and the downstream case 26. A plurality of holes 28 extending through the flanged joint adapt the joint to receive a plurality of nut and bolt assemblies 30. The nut and bolt assemblies hold the upstream ring and the downstream case in abutting contact. Each case structure has the same coefficient of thermal expansion $\alpha_c$. As will be realized, each case structure may have a different coefficient of thermal expansion.

As shown in FIG. 2, the flanged joint 20 has a pair of outwardly convergent sidewalls, such as sidewall 32 and sidewall 34. Sidewall 32 is on the end of the upstream ring 24. Sidewall 34 is on the end of the downstream case 26. An angle $\theta$ is the acute angle between the convergent sidewalls. The convergent sidewalls together form a groove 36 extending circumferentially between the case structures 24,26. The groove is a constricting groove because the walls converge towards each other.

A seal ring 38 is disposed within the groove 36 and extends circumferentially. The seal ring is unsegmented and is free standing. The seal ring has a lip 40 extending inwardly. A support ring 42 has a lip 44 which extends outwardly. The sidewall 32, the sidewall 34 and the support ring 42 cooperate to trap the seal ring in the radial and axial directions. The seal ring has a coefficient of thermal expansion $\alpha_s$. The broken lines in the groove 40 show the moved position of the seal ring which occurs during operation. The broken lines outside of the groove show the seal ring before assembly of the flanged joint.

As shown in FIG. 2 and FIG. 3, the seal ring 38 has a radial cross section 48 which is wedge-shaped. The cross section has a tip region 50. A first surface 52 extends inwardly from the tip region. A second surface 54 extends inwardly from the tip region and diverges inwardly from the first surface. An angle $\theta'$ is the acute angle between the two surfaces. These surfaces might be coated with a low yield strength material such as silver to enhance the sealing capability of the seal ring. As will be realized, the cross section of the seal ring might be solid or hollow. In the embodiment shown, the cross section of the seal ring is hollow, and is formed of material having a thickness t. A first arm 56 and a second arm 58 extend inwardly from the tip region. The lip 40 is joined to the second arm. The first surface is on the first arm. The second surface is on the second arm. The angle between these arms is approximately the angle $\theta'$ between the surfaces on the seal ring.

The wedge-shaped cross section 48 has a surface of circumferential symmetry C spaced equally from the first surface 54 and the second surface 56. The cross section has a radially oriented length L measured along the surface C. The cross section includes a base 58 having a base dimension b. The base dimension b is measured along a line perpendicular to the surface C at the widest portion of the cross section of the seal ring in the seal groove. Because the first arm 56 has a curved portion 62 and the second arm 58 has a curved portion 64, the base dimension is measured between these two curved portions at their line of contact with the sidewalls 32,34 and the surface C. The base dimension of the seal ring in the uninstalled condition is $b_u$, a number larger than the base dimension of the seal ring in the installed condition $b_i$. As will be realized, in other embodiments the base dimension $b_u$ may equal the base dimension $b_i$. During operation, the base dimension b decreases to $b_o$.

FIG. 4 is a simplified perspective view of the seal ring 42 with a portion of the complete hoop broken away to show the cross section 48. The seal ring has an axis of symmetry A. A distance $R_o$ is the distance from the axis of symmetry to the arm 56 of the seal ring. In the embodiment shown, the seal ring is circular having a constant radius $R_o$. The seal ring might be any curved surface such as an ellipse or other circumferentially continuous structure having a wedge-shaped cross section.

Relative thermal expansion between the seal ring 38 and the case structures 24,26 increases the sealing force exerted by the seal ring. The sealing force increases as the distance $R_o$ is increased and decreases as the radially oriented length L increases. A recommended range for the ratio of the distance $R_o$ to the length L is a range of about seventy five to about one hundred seventy ($75 \leq R_o/L \leq 170$). As the ratio approaches the low end of the range, the amount of thermal expansion of the ring and the sealing force is smaller than at the high end of the range. At the high end of the range, thermal expansion is greater but the dimensional stability of the ring in the free state is decreased and the ring may be susceptible to rolling. Rolling is defined as the tendency of the ring to turn inside out in response to external forces. Rolling is discussed in Roark and Young *Formulas for Stress and Strain*, McGraw Hill Book Company (Fifth Edition, 1975), pg. 384. The seal ring must have sufficient axial stiffness such that rolling does not occur during assembly. However, the radial cross section of the seal ring must have a narrow profile to minimize the impact of the base dimension $b_i$ on the width of the groove and thus on the size of the flange. The narrow profile and rolling considerations suggest a ratio of length L to base dimension $b_u$ in a range of about 1.5 to about 3.5 ($1.5 \leq L/b_u \leq 3.5$). In addition, the seal ring must exhibit flexibility to accommodate axial deformation as the seal grows outwardly and contracts inwardly in response to thermal expansion and yet must have a reasonably high spring rate to insure that the sealing force due to thermal growth is adequate. The acute angle $\theta'$ between the surfaces of the seal ring is recommended to lie in a range of about 20° to about 40° ($20° \leq \theta' \leq 40°$). The acute angle $\theta$ between the outwardly convergent sidewalls is recommended to lie in a range of about 20° to about 40° ($20° \leq \theta \leq 40°$). Below an angle of 20° the seal ring begins to act as a flat plate and the sealing force drops off rapidly with compression. Angles above 40° cause the seal ring to experience a large compression of the base for a relatively small radial growth. Moreover, the base dimension is large for the sealing force developed which adversely affects flange weight. As will be realized notwithstanding the above recommendations, effective combinations may result from structures falling outside of these ranges where one or more of the above considerations is not of prime importance.

One satisfactory seal ring 38 is formed of the metal alloy AMS (Aerospace Materials Specification) 5596 disposed in a seal groove bounded by two cylindrical case structures formed of AMS 5707. The coefficient of thermal expansion of AMS 5596 alloy is eight and two tenths millionths of an inch per inch per degree Fahrenheit ($\alpha_s = 8.2 \times 10^{-6}$ in./in.°F.). The coefficient of thermal expansion of AMS 5707 alloy is seven and seven tenths millionths of an inch per inch per degree Fahrenheit ($\alpha_c = 7.7 \times 10^{-6}$ in./in.°F.). This particular seal ring has a thickness t of six thousandths of an inch (0.006 inches), a base dimension b equal to one tenth of an inch (0.10 inches) and a radially oriented length L equal to sixteen hundredths of an inch (0.16 inches). The ratio of the dimension $R_o$ to the radially oriented length L is approximately 130 ($R_o/L \approx 130$). The approximation is caused by tolerances on the dimension $R_o$ which is approximately twenty and thirty-two hundredths of an inch (20.32 inches). The ratio of the radially oriented length L to the base is one and six tenths (L/b=1.6). Such a seal is compressed approximately twenty percent of the base dimension $b_u$ upon assembly.

During operation of a gas turbine engine, working medium gases are flowed along the annular flow path 16 inwardly of the cylindrical case structures, such as the upstream ring 24 and the downstream case 26. A portion of the working medium gases find their way into groove 36 between the upstream ring and the downstream case and find their way around the seal ring 38. This leakage decreases the engine efficiency. As the leaking gases flow into the groove 36, the gases heat the upstream case 22, the upstream ring 24 and the downstream case 26. The flanged joint 20 formed by these structures is cooled by radiation and convection to the ambient atmosphere outwardly of the case structures. A temperature gradient is established in the flange. The temperature at the interior of the flange is larger than the temperatures at the exterior of the flange. As a result of the increase in temperature, the case structures and the flange expand outwardly away from the axis of rotation R. The seal ring is in contact with the inward portion of the upstream ring and the inward portion of the downstream case. The ring, being otherwise spaced from these structures, is otherwise unrestricted against outward movement in the groove. The seal ring, in intimate contact with the hot working medium gases, receives heat from the gases. The ring loses a small amount of heat by conduction to the upstream ring and the downstream case through the almost line to line contact with the curved portions 62,64 of the arms 56,58. The gain in heat causes the seal ring to reach an operating temperature which is approximately one hundred degrees greater (100° F.) than the average temperature of the case structure during sea level takeoff. The differences in temperature and the differences in thermal expansion between the seal ring and the case structures causes the seal ring to move outwardly with respect to the case compressing the base to $b_o$ as shown in FIG. 2. As a result of this compression the sealing force increases. It is important to minimize the area of contact between the ring and the case in situations such as this where the coefficients of thermal expansion are not greatly different. If not, the temperature difference between the seal ring and the case is reduced causing a smaller expansion of the seal ring and a smaller increase in sealing force.

The change in sealing force, at the mating surfaces between the seal ring 38 and the case structures, assuming essentially line to line contact, is graphically represented in FIG. 5. The vertical axis of FIG. 5 is normalized sealing force, defined as the ratio of the sealing force during operation $F_o$ divided by the sealing force at installation $F_i$. The normalized decrease $\Delta b/b_u$ in the base dimension b is represented along the horizontal axis. The decrease in the base dimension is zero for the uninstalled condition where the base dimension is equal to $b_u$. At installation where the base dimension is $b_i$, the percentage decrease in the base dimension is $b_u$ minus $b_i$ divided by $b_u$ times 100% ($b_u - b_i/b_u \times 100\%$). During sea level takeoff, the base dimension has further decreased from $b_u$ to $b_o$.

As can be seen from FIG. 5, a forty-five percent increase in sealing force results from relative thermal expansion between the seal ring and the cylindrical case structures. In the moved position the seal has expanded outwardly a distance with respect to the case structures which is slightly greater than ten percent of the radially oriented length L of the cross section for a difference in temperature of one hundred degrees. The difference in thermal growth takes place because the cylindrical case structures loses heat to the environment through convection and radiation and because the thermal coefficient of expansion of the seal material $\alpha_s$ is greater than the coefficient of thermal expansion of the case structures $\alpha_c$. This seal ring has applicability in any construction where it is desirable to block the leakage between two flanges and where the structure is of the type which might be adapted to experience relative thermal expansion between the seal ring and the flanges. The seal ring has particular applicability to aircraft gas turbine engines because of the narrow base dimension as compared with C-shaped seal rings which exhibit the same sealing force. A seal ring having a wide base dimension b would require larger flanges having an associated increase in weight of the engine and an associated increase in the performance penalty for the aircraft engine. In addition, the pressure and temperature of the working medium gases in gas turbine engines vary together in the same direction, i.e., as the pressure of the working medium gases increase so does the temperature. As the difference in pressure between the working medium gases and the ambient atmosphere increases, the leakage rate for a given leak path increases. As temperature increases, the seal ring 38 expands with respect to the case structures and the seal ring exerts a greater sealing force against the adjacent structure. Accordingly as the need for increased sealing force occurs, increased sealing is provided by the seal ring.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. A flanged joint for joining the abutting ends of two cylindrical case structures, wherein the improvement comprises:
   a pair of outwardly convergent sidewalls, one on each of said cylindrical case ends forming a circumferentially extending groove between the case structures;
   a seal ring having a substantially wedge-shaped cross section disposed within said groove; wherein said seal ring is slidable in the outward direction along the convergent sidewalls of the groove in response to increasing temperature causing a compressive sealing force against the wedge-shaped cross section of the seal ring.

2. The flanged joint of claim 1 wherein the cross section of the seal ring has a length L and wherein the seal means moves outwardly relative to the case structures a distance greater than one-tenth L for a difference in temperature of one hundred degrees Fahrenheit (100° F.) between the seal means and the average temperature of the cylindrical case structures.

3. The flanged joint of claim 1 wherein the exteriors of the case structures are disposed in a fluid and cooled by convection and radiation.

4. The flanged joint of claim 1 wherein the coefficient of thermal expansion of the seal means is greater than the coefficient of thermal expansion of the cylindrical case.

5. The flanged joint of claim 1 wherein an angle $\theta$ is the acute angle between the convergent sidewalls and the angle lies in a range between twenty degrees and forty degrees ($20° \leq \theta \leq 40°$) and wherein the cross section of the seal means has a tip region, a first surface extending inwardly from the tip region, a second surface extending inwardly from the tip region, the second surface being angled with respect to the first surface at an acute angle $\theta'$ which lies in a range between twenty degrees and forty degrees ($20° \leq \theta' \leq 40°$).

6. The flanged joint of claim 5 wherein the seal ring has an axis of symmetry A, the inward portion of the seal ring is at a distance $R_o$ from the axis of symmetry A, the cross section of the seal ring has a radially oriented length L, a base dimension b, and is formed of two arms extending inwardly from the tip region, which diverge inwardly wherein the ratio of $R_o$ to the length L lies in the range of seventy-five to one hundred seventy ($75 \leq R_o/L \leq 170$), and the ratio of the length L to the base dimension b is greater than or equal to one and one-half and less than or equal to three and one-half ($1.5 \leq L/b \leq 3.0$).

7. The stator structure of claim 5 wherein the base dimension has a value $b_u$ in the uninstalled condition, a value $b_i$ in the installed condition and the value $b_u$ is greater than the value $b_i$ ($b_u > b_i$).

8. For an axial flow rotary machine of the type having an annular flow path for hot working medium gases bounded by a first stator structure and a second stator structure wherein the second stator structure is spaced radially from the first stator structure and has flanges extending circumferentially in abutting contact, an improved stator structure which comprises:
  a first flange,
  a second flange spaced from the first flange leaving a groove therebetween extending circumferentially about the flanges which is constricted in the outward direction and is in gas communication with the flow path,
  a seal ring having a wedge-shaped cross section extending circumferentially in the groove, the cross section having a base b which is adapted to engage the flanges, the seal means being adapted to be otherwise unrestricted against outward movement in the groove,
  wherein the wedge-shaped seal means is driven outwardly in the constricting groove by thermal expansion to compress the base of the seal means causing a sealing force between the seal means and the flanges.

9. In an axial flow rotary machine of the type having circumferentially extending flanges spaced apart to form a groove which adapts the flanges to receive a seal ring, the improvement which comprises:
  a seal ring which extends circumferentially about an axis of symmetry, the seal ring having a wedge-shaped radial cross section formed of a tip region and a pair of diverging arms extending inwardly from the tip region and diverging inwardly one from the other at an acute angle,
  wherein each radial arm has a surface and an acute angle $\theta'$ is the angle between the surfaces, wherein each radial arm is spaced a distance $R_o$ from the axis A and the wedge-shaped cross section has a radially oriented length L and a base dimension b; and
  wherein the ratio of the distance $R_o$ to the length L is in a range of about seventy-five to about one hundred seventy ($75 \leq R_o/L \leq 170$), the ratio of the length L to the base dimension b is in a range of one and one-half to three and one-half ($1.5 \leq L/b_u \leq 3.5$), and the acute angle $\theta'$ lies in a range of about twenty degrees to forty degrees.

* * * * *